US010849001B2

(12) United States Patent
Davydov

(10) Patent No.: US 10,849,001 B2
(45) Date of Patent: Nov. 24, 2020

(54) MEASUREMENT RESTRICTIONS FOR COMP

(71) Applicant: INTEL CORPORATION, Santa Clara, CA (US)

(72) Inventor: Alexei Davydov, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 32 days.

(21) Appl. No.: 16/073,307

(22) PCT Filed: Mar. 21, 2017

(86) PCT No.: PCT/US2017/023453
§ 371 (c)(1),
(2) Date: Jul. 26, 2018

(87) PCT Pub. No.: WO2017/165447
PCT Pub. Date: Sep. 28, 2017

(65) Prior Publication Data
US 2019/0037429 A1 Jan. 31, 2019

Related U.S. Application Data

(60) Provisional application No. 62/312,729, filed on Mar. 24, 2016.

(51) Int. Cl.
H04W 24/10 (2009.01)
H04L 5/00 (2006.01)
(Continued)

(52) U.S. Cl.
CPC .......... H04W 24/10 (2013.01); H04B 7/0626 (2013.01); H04L 5/005 (2013.01);
(Continued)

(58) Field of Classification Search
None
See application file for complete search history.

(56) References Cited

U.S. PATENT DOCUMENTS

2015/0215856 A1* 7/2015 Kim ................. H04W 48/16
370/252
2015/0215906 A1* 7/2015 Park ................. H04W 76/10
370/312

OTHER PUBLICATIONS

3GPP TS 36.211 V12.7.0: Evolved Universal Terrestrial Radio Access (E-UTRA); Physical channels and modulation (Release 12); Valbonne—France.
(Continued)

Primary Examiner — Christine T Duong
(74) Attorney, Agent, or Firm — Alliance IP, LLC

(57) ABSTRACT

An apparatus of a user equipment (UE) configured for a transmission mode 10 (TM 10) and operable to perform downlink coordinated multi-point (CoMP) operations with a single transmission point (TP) is disclosed. The apparatus can decode configuration information for a non-zero channel state information reference signal (NZP CSI-RS) resource received from a serving cell. The apparatus can decode configuration information for a measurement restriction for the NZP CSI-RS resource for the UE received from the serving cell. The apparatus can configure the UE with a quasi-co-location (QCL) type A and not a QCL type B based on the measurement restriction. The apparatus can decode channel state information reference signals (CSI-RS) received from the single transmission point in the configured NZP CSI-RS resource on different downlink (DL) subframes.

12 Claims, 9 Drawing Sheets

(51) Int. Cl.
    *H04B 7/06*          (2006.01)
    *H04W 4/02*          (2018.01)
    *H04W 48/12*        (2009.01)
    *H04W 64/00*        (2009.01)

(52) U.S. Cl.
    CPC ........... *H04L 5/0035* (2013.01); *H04W 4/023* (2013.01); *H04W 48/12* (2013.01); *H04W 64/003* (2013.01)

(56) References Cited

OTHER PUBLICATIONS

3GPP TS 36.213 V12.7.0: Evolved Universal Terrestrial Radio Access (E-UTRA); Physical layer procedures (Release 12); Valbonne—France.
3GPP TSG-RAN WG1#82; R1-154950; Ericsson; CSI feedback for FD-MIMO; Agenda Item: 7.2.5.1.2; Beijing China; Aug. 24-28, 2015.
3GPP TSG RAN WG1 Meeting #83; R1-156779; Samsung; Discussion on QCL assumptions for FD-MIMO; Anaheim, California; Nov. 16-20, 2015.

\* cited by examiner

MEASUREMENT RESTRICTIONS FOR COMP

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs, or gNBs) which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
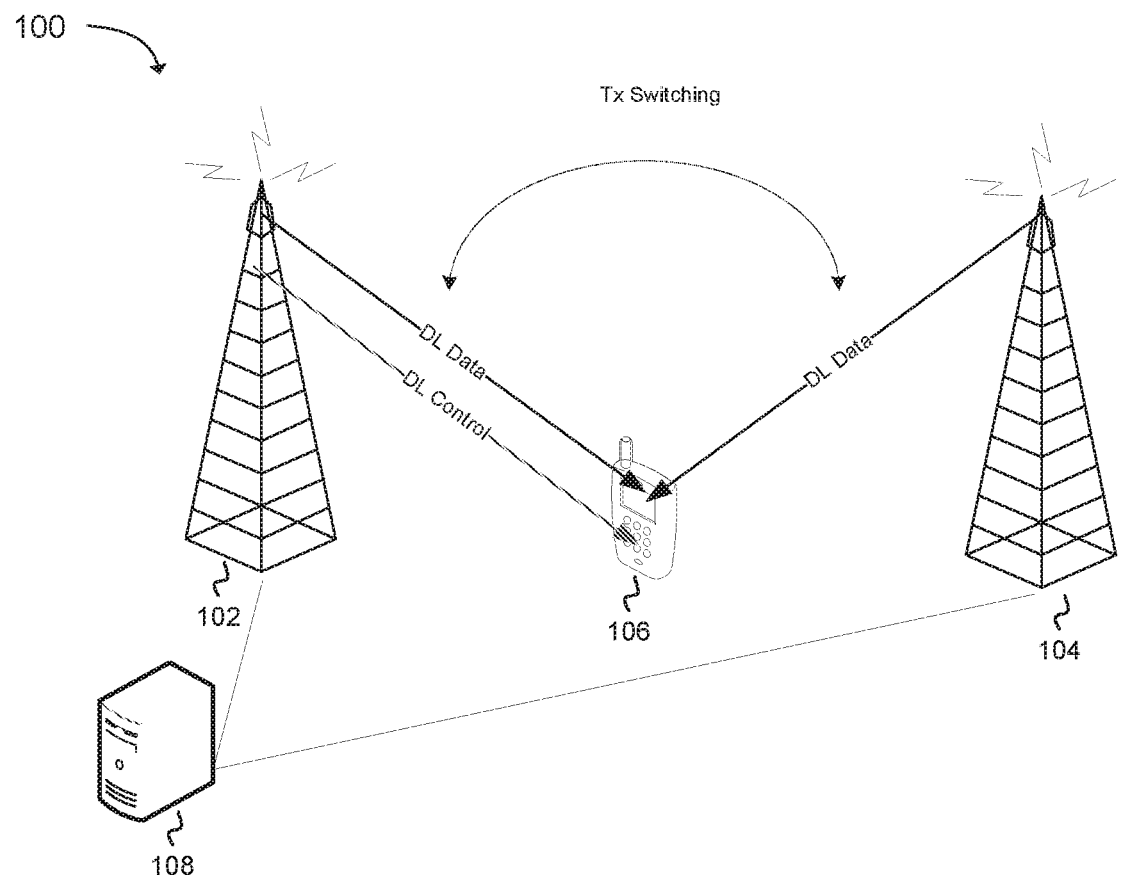
FIG. 1 depicts functionality of dynamic point selection Coordinated Multi-Point transmission/reception (CoMP) scheme in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In 3GPP LTE Release 13, shallow interference measurement restrictions were introduced that can be applied for channel state information (CSI). In one example, a UE may perform channel estimation using CSI across multiple downlink subframes, and average the estimated channel across the multiple downlink subframes over which CSI has been received. The UE can interpolate the channel to a future subframe, such as subframes where CSI is not transmitted.

In a full dimensional (FD)-MIMO system, the UE may support multiple beams. The UE may want to estimate the channel for different beamforming, using a CSI-RS signal received from an eNB. By requesting a CSI report for the UE in different time instances, the base station can obtain CSI information for different beamforming instances. Since the beamforming is different, in the general case, the channel estimated by the UE on one DL subframe, is not the same as the channel on another subframe because of different channels and losses associated with beamforming. Even if the UE doesn't move, and the propagation is substantially static, the channel estimation can be different because of the use of beamforming. Accordingly, the channels estimated by the UE are different and averaging and estimating are not typically accurate. Therefore, the network can incorporate the use of measurement restrictions to prevent the UE from estimating across multiple subframes.

The present technology describes radio access network (RAN) impacts due to full dimensional (FD)-MIMO channel and interference measurement restrictions as part of a 3GPP LTE Release 13

In one example interference measurement restrictions can be applied for channel state information (CSI) measurements and provide a means to the network to reduce the measurement resource overhead and the number of higher-layer configurations for the UEs. More specifically, the same interference measurement resource (CSI-IM) configured for the UE may be used for intra-cell interference measurements from co-scheduled UEs, which may use different beamforming.

In another example, in order to provide the information to the network about CSI information under certain interference condition the interference averaging (e.g. in the time domain across sub frames) can be prevented and restricted to a single downlink sub frame.

A UE configured in transmission mode 8-10 for a serving cell may assume the antenna ports 7-14 of the serving cell are quasi co-located for a given subframe with respect to delay spread, Doppler spread, Doppler shift, average gain, and average delay.

A UE configured in transmission mode 1-9 for a serving cell may assume the antenna ports 0-3, 5, 7-22 of the serving cell are quasi co-located with respect to Doppler shift, Doppler spread, average delay, and delay spread. A UE configured in transmission mode 10 for a serving cell is configured with one of two quasi co-location types for the serving cell by higher layer parameter qcl-Operation to decode PDSCH according to transmission scheme associated with antenna ports 7-14.

The first is Type A quasi co-location. In Type A the UE may assume the antenna ports 0-3, 7-22 of a serving cell are quasi co-located with respect to delay spread, Doppler spread, Doppler shift, and average delay.

The second is Type B quasi co-location. In Type B, the UE may assume the antenna ports 15-22 corresponding to the CSI-RS resource configuration identified by the higher layer parameter qcl-CSI-RS-ConfigNZPId-r11 (defined in subclause 7.1.9) and the antenna ports 7-14 associated with the PDSCH are quasi co-located with respect to Doppler shift, Doppler spread, average delay, and delay spread.

A serving eNB can include a primary carrier and at least one secondary carrier where the primary carrier is a legacy carrier type and the secondary carriers may be a non-standalone NCT. The primary and secondary carriers can be configured as quasi co-located (QCL) carriers, such that, for example, the large-scale parameters of the channel between the secondary carrier and the UE can be inferred from the large scale parameters of the channel between the primary carrier and the UE. Large scale parameters (or QCL synchronization parameters) may include one or more of delay spread, Doppler spread, Doppler shift, average gain and average delay.

The primary carrier of eNB may be configured to provide signaling to the UE to identify which secondary carriers are QCL with the primary carrier. In some embodiments, this signaling can also indicate which QCL synchronization parameters can be shared between the primary and secondary carriers. The primary carrier can also be configured to transmit a CRS to the UE from which the UE can obtain these synchronization parameters for communication with both the primary and secondary carriers, eliminating the need for the secondary carrier to transmit CRS signals.

In one example, in accordance to the 3GPP LTE Rel-13 specification in transmission mode 10, a UE may be configured with measurement restriction for interference measurements. If such a configuration is enabled, the UE can limit a CSI calculation to a single downlink sub frame corresponding to a CQI reference resource. In this case, when the CSI is reported by the UE, the network has full information on the downlink subframe that was used for interference measurements to derive the CSI.

In one example, a measurement restriction can be applied to the channel measurements on non zero-power CSI-RS (NZP CSI-RS) resources. For example, the network may use the same NZP CSI-RS resource for the link quality under different transmit beamforming assumptions. In this case, the channel averaging at the UE can be prevented to provide CSI information corresponding to the specific beam assignment to the transmitted CSI-RS. If such a configuration is enabled, the UE can limit the CSI calculation to the single downlink sub frame corresponding to the CQI reference resource. In this case, when the CSI is reported by the UE, the network has full information on the downlink subframe that was used for the channel measurements for the CSI calculation.

In another example, measurement restriction can be also used for coordinated multi-point (CoMP) scenarios with dynamic point selection (DPS). More specifically, the same NZP CSI-RS resource can be used for CSI-RS transmission by different transmission points in different subframes. In this case, the network may obtain the CSI information corresponding to different transmission points by using a single NZP CSI-RS configuration at the UE.

When measurement restriction is configured for the UE, and in the case that the configured NZP CSI-RS resource can't be used for large scale parameter estimation such as Doppler shift, Doppler spread, average delay, delay spread and average gain, the different transmission points may reuse the NZP CSI-RS resource configuration for CSI-RS transmission.

In another example, where a user equipment can configure a CSI-RS resource from multiple sources, the UE can estimate the channel state information measurements. When the measurement restriction is configured while the UE is performing the channel estimation, the configuration can take place in a single subframe. In the case that the network or base station is trying to reuse a CSI-RS signal, to apply beamforming or share the same resource by different transmission points, it can be indicated to the UE that it should avoid possible averaging of the channel across subframes to prevent ambiguities.

FIG. 1 depicts functionality of dynamic point selection (DPS) Coordinated Multi-Point transmission/reception (CoMP) scheme 100. In DPS CoMP 100, the transmission point can be dynamically selected for the user equipment (UE) 106 in accordance to the instantaneous channel/interference conditions and cell load 108. The introduction of downlink coordinated multi-point (DL CoMP) addresses the issue of throughput performance for cell edge users. The throughput improvement in DL CoMP can be achieved by coordination of the neighboring cells e.g. by using dynamic point selection (DPS) as depicted in FIG. 1.

As the physical downlink shared channel (PDSCH) transmission in DL CoMP 100 may not be co-located with the serving cell 102, a quasi-co-location signaling has been introduced to indicate a plurality of reference signals, and the associated antenna ports, which experience the same propagation. The same propagation is typically experienced when the antenna ports used to send the reference signals belong to the same transmission point, such as the serving cell 102 or the adjacent cell 104 that are associated with a network 108.

In a one embodiment, the Quasi co-location in an LTE-Advanced network 108 can be used to establish a connection between different reference signals with respect to different physical characteristics such as Doppler shift, Doppler spread, average delay, delay spread and average gain. These physical characteristics are referred to as large-scale properties. In this embodiment, if the connection is established (e.g. due to co-location of the transmission) the measurements of one parameter on one type of the reference signal can be reused for processing of another reference signal.

In 3GPP Technical Specification (TS) 36.211, Version 11.1.0, quasi co-location is defined as follows: Two antenna ports are said to be quasi co-located if the large-scale properties of the channel over which a symbol on one antenna port 102 is conveyed can be inferred from the channel over which a symbol on the other antenna port 104 is conveyed. The large-scale properties include one or more of delay spread, Doppler spread, Doppler shift, average gain, and average delay.

The relationship between reference signals and antenna ports can be defined in the following configuration. The Common Reference Signals (CRS) can be transmitted using antenna ports 0, 1, 2, 3. The CSI-RS can be transmitted using antenna ports 15, 16, 17, 18, 19, 20, 21,22. The physical downlink shared channel UE-specific RS can be transmitted using antenna ports 7, 8. And, the enhanced physical downlink control channel (ePDCCH) UE-specific RS can be transmitted using antenna ports 107, 108, 109, and 110.

A UE 106 configured in transmission mode 1-10 may assume that the antenna ports 0-3 of a transmission point, such as serving cell 102, are quasi co-located (as defined in 3GPP TS 36.211 v.11.1.0) with respect to delay spread, Doppler spread, Doppler shift, average gain, and average delay.

A UE 106 configured in transmission mode 8-10 may assume the antenna ports 7-14 of a serving cell 102 are quasi co-located (as defined in TS 36.211 v.11.1.0) for a given subframe with respect to delay spread, Doppler spread, Doppler shift, average gain, and average delay.

A UE 106 configured in transmission mode 1-9 may assume the antenna ports 0-3, 5, 7-22 of a serving cell 102 are quasi co-located (as defined in Rel-11 TS 36.211 v.11.1.0) with respect to Doppler shift, Doppler spread, average delay, and delay spread.

A UE 106 configured in transmission mode 10 can be configured with one of two quasi co-location (QCL) types by higher layer signaling to decode the PDSCH according to a transmission scheme associated with antenna ports 7-14. The QCL types are referred to as QCL Type A and QCL Type B, or QCL behavior Type A or Type B.

Where the configuration of the QCL behavior is Type A, the UE 106 may assume that the antenna ports 0-3 and 7-22 of a serving cell 102 are quasi co-located (as defined in TS 36.211 v.11.1.0) with respect to delay spread, Doppler spread, Doppler shift, and average delay.

In QCL behavior type A, CRS, CSI-RS, and UE-specific RS can be considered to be quasi co-located with respect to delay spread, Doppler spread, Doppler shift, and average delay. Such QCL behavior does not support DPS CoMP.

In another example, where only QCL Type A is utilized, the network can be forced to prohibit time division multiplexing (TDM) behavior. If the measurement restriction is configured, the CSI-RS resource should originate from the same transmission point, and can subsequently be beamformed in a plurality of ways.

Where the configuration of the QCL behavior is Type B, the UE 106 may assume the antenna ports 15-22 corresponding to the CSI-RS resource configuration identified by 'CSI-RS resource configuration identity for PDSCH RE mapping' in Section 7.1.9 of 3GPP TS 36.213 Version 11.1.0 and the antenna ports 7-14 associated with the PDSCH are quasi co-located (as defined in defined in TS 36.211 v.11.1.0) with respect to Doppler shift, Doppler spread, average delay, and delay spread.

In QCL behavior type B, downlink control information (DCI) based signaling is used to indicate quasi-location between antenna ports 102/104 of one CSI-RS (among four configured) and UE-specific RS antenna ports 102/104 of the same serving cell 102 w.r.t. delay spread, Doppler spread, Doppler shift, and average delay.

In one example, in order to handle QCL type B issues with measurement restriction for the channel, the UE is not expected to be configured with QCL type B when measurement restriction (for channel) is configured for the UE.

In another example, in order to handle QCL type B issues with measurement restriction for the channel, the antenna ports on which PDSCH and De-Modulation Reference Signal (DM-RS) is transmitted may be associated with the latest CSI-RS for which CSI was reported or requested by aperiodic CSI.

In another example, in order to handle QCL type B issues with measurement restriction for the channel, the QCL signaling for QCL type B may include CSI-RS configuration (e.g. subframe configuration) that should be used for time frequency tracking.

In another example, in order to handle QCL type B issues with measurement restriction for the channel, the QCL signaling is not used/applied when channel measurement restriction is configured for the UE.

In another example, in order to handle QCL type B issues with measurement restriction for the channel, the CSI-RS resource configured with measurement restriction is not used for QCL with DM-RS antenna ports.

PDSCH Resource Mapping Parameters

In one embodiment, a UE 106 configured in transmission mode 10 for a given serving cell 102 can be configured with up to 4 parameter sets by higher layer signaling to decode the Physical Downlink Shared Channel (PDSCH) according to a detected Physical Downlink Control Channel (PDCCH)/enhanced PDCCH (EPDCCH) with DCI format 2D intended for the UE 106 and the given serving cell 102. The UE 106 can use the parameter set according to the value of the 'PDSCH resource element (RE) Mapping and Quasi-Co-Location indicator' field (mapping defined in 3GPP TS 36.213 v.11.1.0, Table 7.1.9-1) in the detected PDCCH/EPDCCH with DCI format 2D for determining the PDSCH RE mapping (defined in 3GPP TS 36.213 v.11.1.0, Section 6.3.5) and PDSCH antenna port quasi co-location (defined in 3GPP TS 36.213 v.11.1.0, Section 7.1.10).

For PDSCH without a corresponding PDCCH, the UE 106 can use the parameter set indicated in the PDCCH/EPDCCH with DCI format 2D corresponding to the associated semi-persistent scheduling (SPS) activation for determining the PDSCH RE mapping (defined in 3GPP TS 36.213 v.11.1.0, and Section 6.3.5 of 3GPP TS 36.211 v 11.1.0) and PDSCH antenna port quasi co-location (defined in 3GPP TS 36.213 v.11.1.0, Section 7.1.10).

The UE can be configure to know that for DM-RS and for PDSCH, large scale parameters from a later CSI transmission for which CSI was requested can be utilized. The use of this method can minimize ambiguity for the UE of which CSI transmission it should use for PDSCH and DMRS.

In another embodiment the UE may be configured with 3 CSI-RS. Where there are at least two coordinating transmission points, the first and second CSI-RS can be associated with a single antenna port. The first CSI-RS may be transmitted by the first TP, and the second by the second TP. The third CSI-RS may be shared by different TPs, and may have a number of antenna ports. In the case where there is a third CSI-RS, the third CSI-RS without a pair may be shared by different transmission points, and may have a number of antenna ports. Further, the first and second CSI-RS can be used to determine large scale parameter measurements. The CSI can be obtained from the third CSI-RS, which contains multiple antenna ports. The third CSI-RS can be used to perform channel measurements, or for QCL signaling for DM-RS antenna ports.

Figure 2:
FIG. 2 illustrates a table of value of PDSCH Re Mapping and Quasi-Co-Location Indicator field in accordance with an example.

FIG. 2 illustrates a table of values of PDSCH Re Mapping and Quasi-Co-Location Indicator field in downlink control information (DCI) format 2D. The parameters indicated in the table 200 can be used to determine PDSCH RE mapping and PDSCH antenna port quasi co-location. PDSCH RE Mapping and PDSCH antenna port can be configured via higher layer signaling for each parameter set such as: 'Number of CRS antenna ports for PDSCH RE mapping'; 'CRS frequency shift for PDSCH RE mapping'; 'Multicast-broadcast single-frequency network (MBSFN) subframe configuration for PDSCH RE mapping'; 'Zero-power CSI-RS resource configuration for PDSCH RE mapping'; 'PDSCH starting position for PDSCH RE mapping'; and, 'CSI-RS resource configuration identity for quasi co-location'.

In one embodiment a UE configured in transmission mode 10 for a given serving cell can be configured with a parameter set selected from the four parameter sets in 3GPP TS 36.213 v.11.1.0, Table 7.1.9-1 by higher layer signaling for determining the PDSCH RE mapping (defined in 3GPP TS 36.213 v. 11.1.0, Section 6.3.5) and PDSCH antenna port quasi co-location (defined in 3GPP TS 36.213 v.11.1.0, Section 7.1.10) to decode the PDSCH according to a detected PDCCH/EPDCCH with DCI format 1A intended for the UE and the given serving cell.

In another embodiment, the UE can use the configured parameter set, determining the PDSCH RE mapping (defined in 3GPP TS 36.213 v. 11.1.0, Section 6.3.5) and PDSCH antenna port quasi co-location (defined in 3GPP TS 36.213 v.11.1.0, Section 7.1.10) for decoding PDSCH corresponding to detected PDCCH/EPDCCH with DCI format 1A and PDSCH without a corresponding PDCCH associated with SPS activation indicated in PDCCH/EPDCCH with DCI format 1A.

In addition for transmission mode 10, CSI-RS can be quasi co-located with CRS with respect to Doppler shift, and Doppler spread as seen from 3GPP TS 36.213 v.11.1.0.

In another embodiment, a UE configured in transmission mode 10 and with quasi co-location type B, may assume the antenna ports 0-3 associated with 'Cell ID for quasi-co-located CRS' corresponding to a CSI-RS resource configuration and antenna ports 15-22 corresponding to the CSI-RS resource configuration are quasi co-located (as defined in 3GPP TS 36.211 v.11.1.0) with respect to Doppler shift, and Doppler spread.

Figure 3:
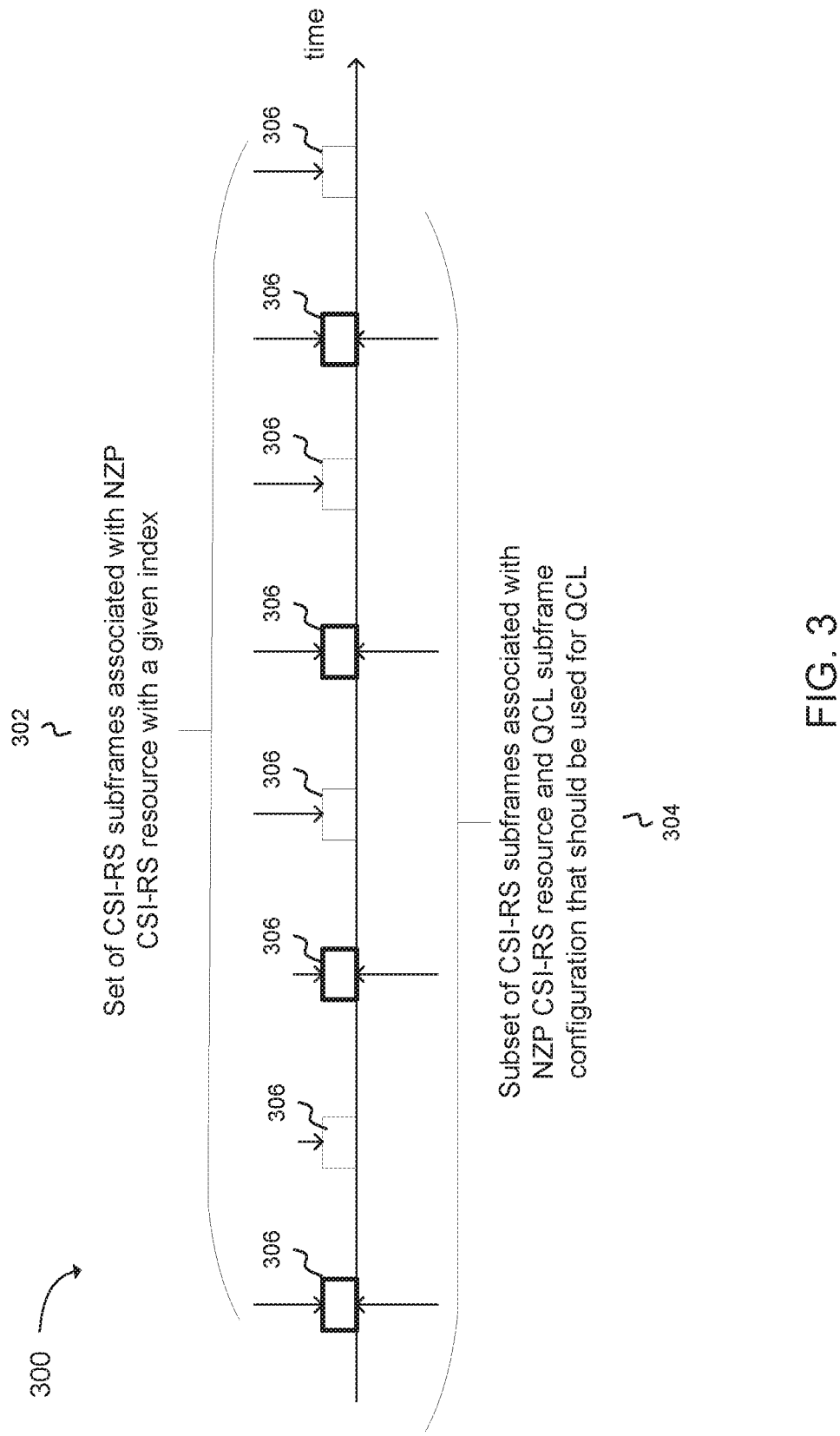
FIG. 3 depicts functionality of Channel State Information Reference Signal (CSI-RS) subframe subset indication for quasi co-location (QCL) in accordance with an example.

FIG. 3 depicts functionality of Channel State Information Reference Signal (CSI-RS) subframe subset indication for quasi co-location (QCL).

In one embodiment, the UE can be not expected to be configured with QCL type B when the UE is configured for a measurement restriction (for a channel). In this case the measurement restriction may only be used in QCL type A when DM-RS, CSI-RS and CRS antenna ports are QCL-ed. This implies a single point operation (non DPS mode) or a tight time and frequency synchronization in the network.

In another embodiment the CSI-RS antenna ports (along with associated CRS antenna ports) that should be assumed to be QCL-ed with the DM-RS antenna ports on which PDSCH and DM-RS were transmitted can be connected with each other based on the timing of the CSI-RS transmission. For example, the latest CSI-RS transmission which was used for a CSI calculation and reporting may be assumed as quasi co-located (QCL-ed) with the DM-RS antenna ports.

In another embodiment, a radio resource control (RRC) configured QCL parameter set 300 may include the additional parameters of the CSI-RS 306 indicating the subset 304 of the NZP CSI-RS resources for QCL. For example, the subframe configuration of CSI-RS 302 can be additionally signaled to the UE along with the existing signaling of the NZP CSI-RS resource index 304. The QCL subframe configuration of CSI-RS 302 can indicate the subset 304 of the subframes of the CSI-RS resource 302 (for which the index is provided as part of the existing QCL signaling). The other parameters of the CSI-RS may be reused from the CSI-RS configuration for which the CSI-RS index 302 is provided. In this embodiment, the UE may only be allowed to use the subset 304 of the CSI-RS resources for large scale parameter estimation the subset of the CSI-RS resources 304 for large scale parameter estimation for QCL with DM-RS antenna ports.

In one example, the RRC signaling extension for this embodiment can comprise of the following information: 'Number of CRS antenna ports for PDSCH RE mapping'; 'CRS frequency shift for PDSCH RE mapping'; 'MBSFN subframe configuration for PDSCH RE mapping'; 'Zero-power CSI-RS resource configuration for PDSCH RE mapping'; 'PDSCH starting position for PDSCH RE mapping'; 'CSI-RS resource configuration identity for quasi co-location'; and, 'CSI-RS subframe configuration for quasi co-location'.

In another embodiment, the UE may assume a new QCL behavior where QCL between DM-RS and CSI-RS antenna ports are not signaled to the UE. In this embodiment, at least the timing offset and Doppler shift can be calculated by the UE directly from the received DM-RS antenna ports.

In another embodiment, the CSI-RS resource configured with measurement restriction may not be used for QCL with DM-RS antenna ports. As such, this embodiment, along with the previous embodiments described above are equally applicable to PDSCH and EPDCCH transmission based on the DM-RS antenna ports.

In another embodiment, a subframe 306 can be a part of a subset 304 of CSI-RS and further be quasi-co-located. In addition, the subframes 306, receiving transmissions from subsets using QCL 304 and non-QCL subsets 302, can be assumed to indicate CSI-RS time instance which corresponds to the CSI-RS from the same transmission points, or two different transmission points.

In another embodiment, the quasi co-location (QCL) signaling may include additional CSI-RS configuration parameters indicating subset 304 of the resources of the configured NZP CSI-RS that can be used for large scale parameter estimation and subframe 306 configuration.

In another embodiment, the same CSI-RS resource can be shared across multiple transmission points. In addition the UE can assume all large scale parameters are the same, so it can use averaging across different subframes. The sharing of resources across a plurality of different transmission points, can allow the large scale parameters to be different depending on the timing and its configuration with QCL Type B.

Figure 4:
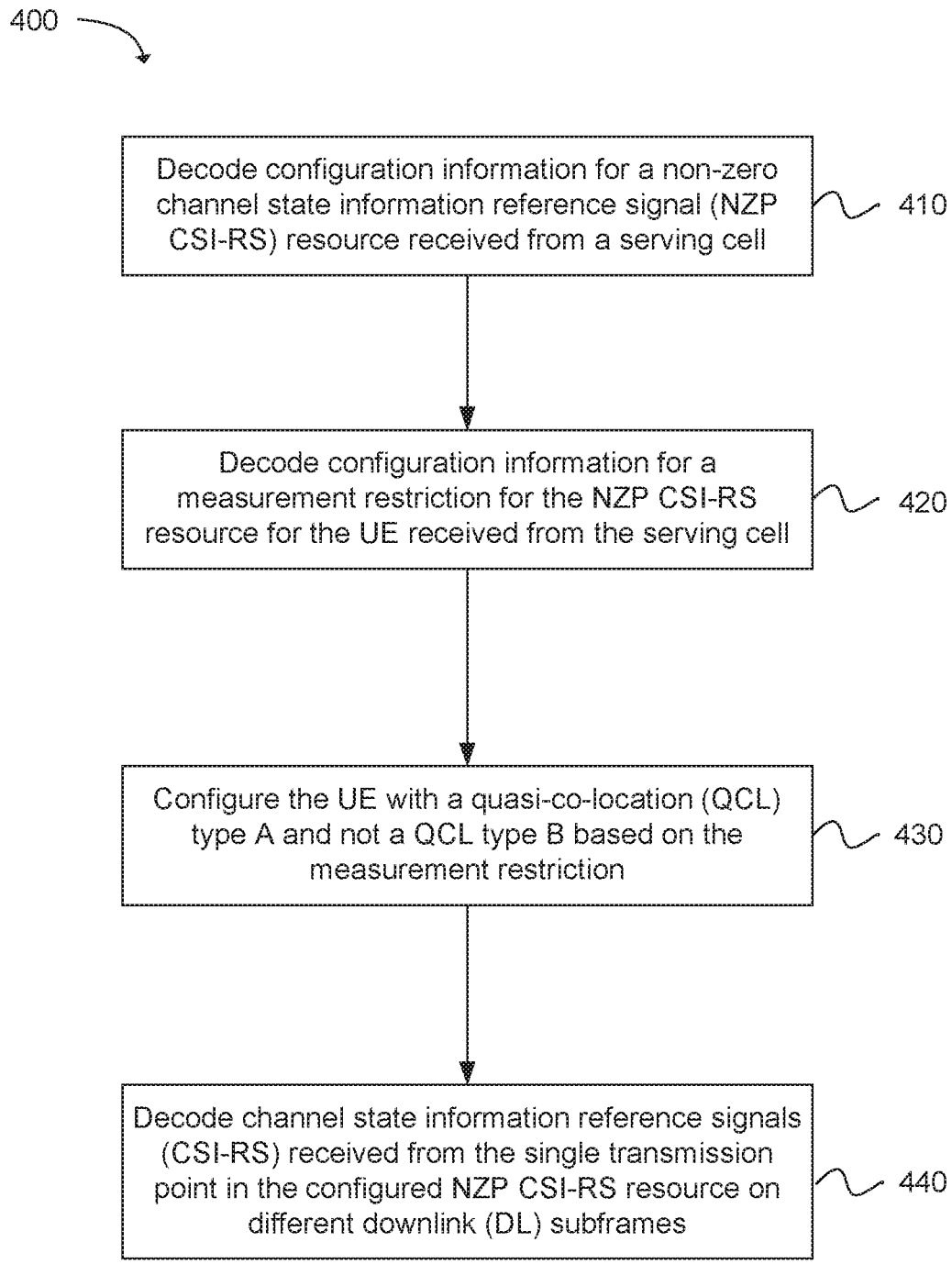
FIG. 4 depicts functionality of an apparatus of a UE operable to perform downlink coordinated multi-point (CoMP) operations with a single transmission point (TP), in accordance with an example.

Another example provides functionality 400 of an apparatus of a UE configured for a transmission mode 10 (TM 10) and operable to perform downlink coordinated multipoint (COMP) operations with a single transmission point (TP), as show in FIG. 4. The apparatus of the UE can comprise one or more processors configured to decode configuration information for a non-zero channel state information reference signal (NZP CSI-RS) resource received from a serving cell 410. The apparatus of the UE can comprise one or more processors configured to decode configuration information for a measurement restriction for the NZP CSI-RS resource for the UE received from the serving cell 420. The apparatus of the UE can comprise one or more processors configured to configure the UE with a quasi-co-location (QCL) type A and not a QCL type B based on the measurement restriction 430. The apparatus of the UE can comprise one or more processors configured to decode channel state information reference signals (CSI-RS) received from the single transmission point in the configured NZP CSI-RS resource on different downlink (DL) subframes 440.

In one embodiment, the one or more processors can be configured are configured to decode the CSI-RS signals received on one or more of antenna ports 7 to 22 which are quasi-co-located with CRS antenna ports 0 to 3 transmitted by the serving cell.

In one embodiment, the antenna ports 0 to 3 and 7 to 22 can be quasi-co-located with respect to large scale parameters. The large scale parameters can comprise Doppler shift, Doppler spread, average delay and delay spread, to enable the UE to measure the large scale parameters using the QCL antenna ports.

In one embodiment, the one or more processors can be configured to decode configuration information received from the single transmission point via higher layer signaling. The parameter set can comprise of a number of cell-specific reference signal (CRS) antenna ports for physical downlink shared channel (PDSCH) resource elements (RE) mapping; a CRS frequency shift for PDSCH RE mapping; a multicast broadcast single frequency network (MBSFN) subframe configuration or PDSCH RE mapping; a Zero-power CSI-RS resource configuration for PDSCH RE mapping; a PDSCH starting position for PDSCH RE mapping; and, a CSI-RS resource configuration identity for quasi co-location.

In one embodiment a plurality of coordinating TPs can be configured for tight time and frequency synchronization.

In one embodiment the CSI-RS signals can originate from the same serving cell, when the measurement restriction for CSI-RS is configured.

In one embodiment the DM-RS antenna port corresponds to antenna ports of the PDSCH, and an enhanced physical downlink control channel (EPDCCH)

Figure 5:
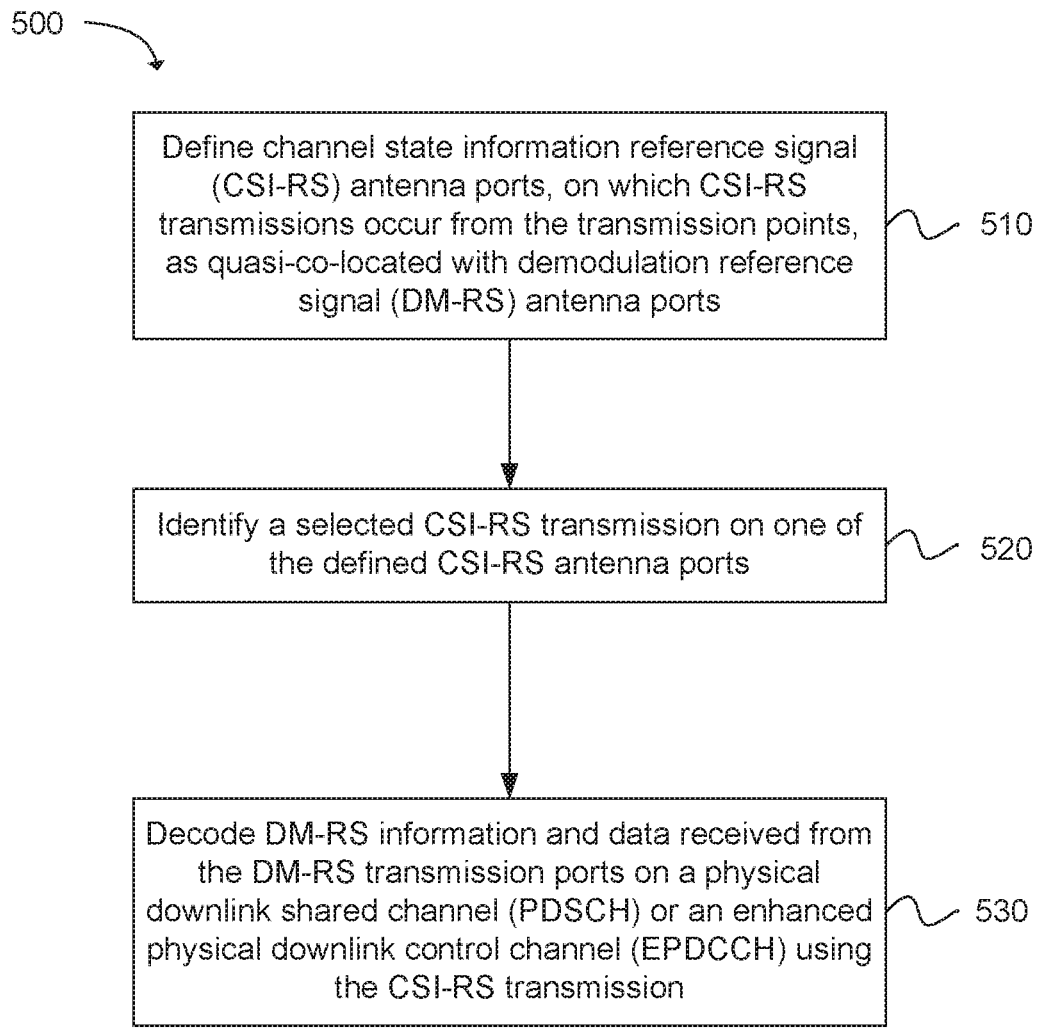
FIG. 5 depicts functionality of an apparatus of a UE operable to configured for a transmission mode 10 (TM 10) and operable to perform downlink coordinated multi-point (CoMP) operations with dynamic point selection (DPS) of transmission points, in accordance with an example.

Another example provides functionality 500 of an apparatus of a UE configured for a transmission mode 10 (TM 10) and operable to perform downlink coordinated multipoint (CoMP) operations with dynamic point selection (DPS) of transmission points, as depicted in FIG. 5. The apparatus of the UE can comprise one or more processors configured to define channel state information reference signal (CSI-RS) antenna ports, on which CSI-RS transmissions occur from the transmission points, as quasi-co-located with demodulation reference signal (DM-RS) antenna ports 510. The apparatus of the UE can comprise one or more processors configured to identify a selected CSI-RS transmission on one of the defined CSI-RS antenna ports 520. The apparatus of the UE can comprise one or more processors configured to decode DM-RS information and data received from the DM-RS transmission ports on a physical downlink shared channel (PDSCH) or an enhanced physical downlink control channel (EPDCCH) using the CSI-RS transmission 530.

In one embodiment, the one or more processors can be configured to estimate large-scale parameters for the CSI-RS antenna ports and the DM-RS antenna ports using the selected CSI-RS transmission. Wherein, the large scale parameters can include Doppler shift, Doppler spread, average delay, delay spread and average gain.

In one embodiment, the one or more processors can be configured to identify a selected CSI-RS transmission as a last transmitted CSI-RS transmission wherein a channel state information (CSI) request is received by the UE.

In one embodiment the one, or more processors can be configured to decode the CSI-RS transmissions received on one or more of CSI-RS antenna ports 15 to 22.

In one embodiment, the one or more processors can further comprise of cell-specific reference signals (CRS) transmitted on antenna port 0 to 3 associated with the NZP CSI-RS resource transmitted on antenna ports 15 to 22.

In one embodiment, the DM-RS antenna port corresponds to antenna ports of the PDSCH or an enhanced physical downlink control channel (EPDCCH).

Figure 6:
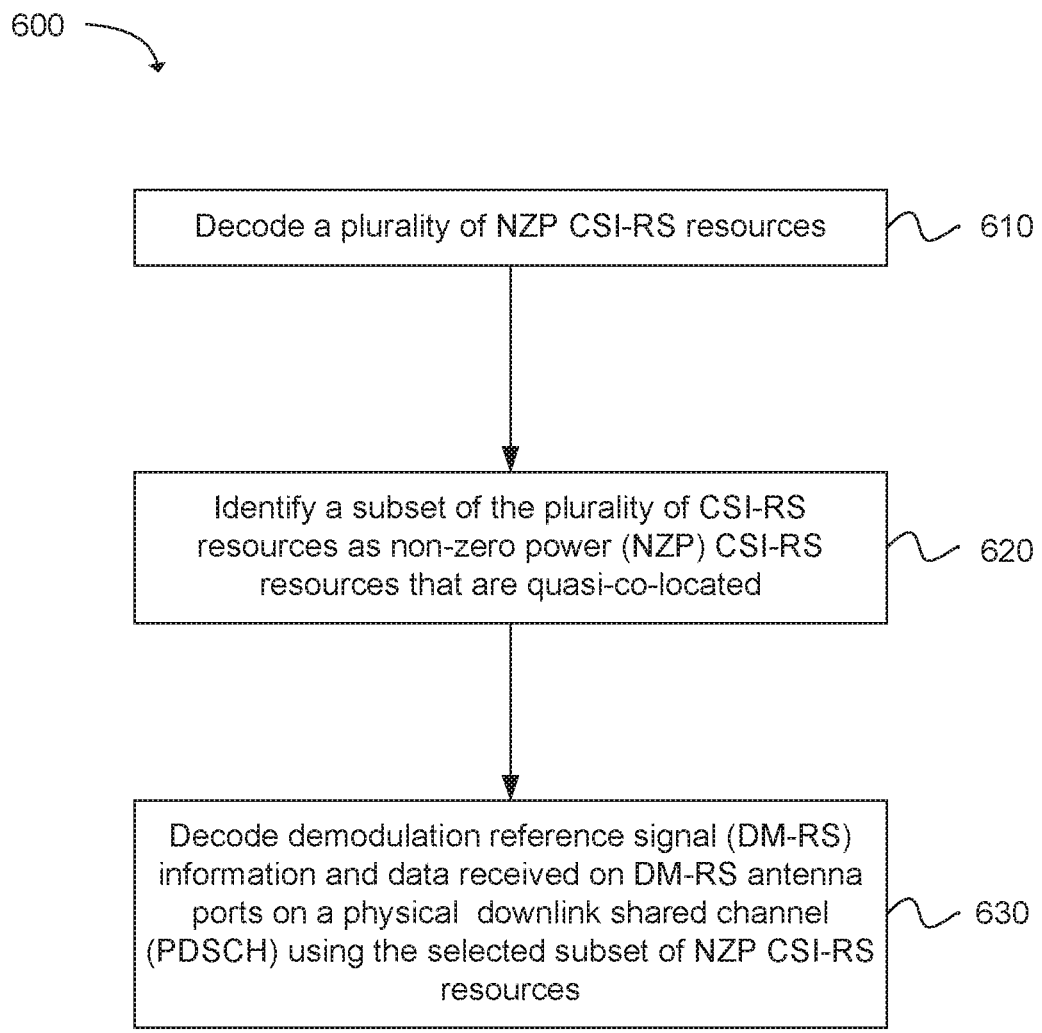
FIG. 6 depicts functionality of an apparatus of a UE operable to configured for a transmission mode 10 (TM 10) and operable to perform downlink coordinated multi-point (CoMP) operations with dynamic point selection (DPS) of transmission points, in accordance with an example.

Another example provides functionality 600 of an apparatus of a UE configured for a transmission mode 10 (TM 10) and operable to perform downlink coordinated multipoint (CoMP) operations with dynamic point selection (DPS) of transmission points, as depicted in FIG. 6. The apparatus of the UE can comprise one or more processors configured to decode a plurality of NZP CSI-RS resources 610, The apparatus of the UE can comprise one or more processors configured to identify a subset of the plurality of CSI-RS resources as non-zero power (NZP) CSI-RS resources that are quasi-co-located 620. The apparatus of the UE can comprise one or more processors configured to decode demodulation reference signal (DM-RS) information and data received on DM-RS antenna ports on a physical downlink shared channel (PDSCH) using the selected subset of NZP CSI-RS resources 630.

In one embodiment, the one or more processors can be configured to decode configuration information received from a DPS transmission from the transmission points via higher layer signaling, wherein the configuration information includes a radio resource control. The RRC QCL parameters set can comprise a number of cell-specific reference signal (CRS) antenna ports for physical downlink shared channel (PDSCH) resource element (RE) mapping. The RRC QCL parameters set can comprise a CRS frequency shift for PDSCH RE mapping. The RRC QCL parameters set can comprise a multicast broadcast single frequency network (MBSFN) subframe configuration for PDSCH RE mapping. The RRC QCL parameters set can comprise a zero-power CSI-RS resource configuration for PDSCH RE mapping. The RRC QCL parameters set can comprise a PDSCH starting position for PDSCH RE mapping. The RRC QCL parameters set can comprise a CSI-RS resource configuration identity for quasi co-location.

In one embodiment the RRC QCL parameter set can further comprise a CSI-RS subframe configuration for quasi co-location indication of NZP CSI-RS resources.

In one embodiment the selected subset of the NZP CSI-RS resources that are quasi-co-located, can comprise a predetermined index of the CSI-RS resources.

In one embodiment, the one or more processors can be configured to estimate large-scale parameters for the DM-RS antenna ports using the selected subset of the NZP CSI-RS resources that are quasi-co-located and DM-RS.

In one embodiment, the one or more processors can be configured to calculate a timing offset and a Doppler shift at the UE from an antenna port of a received demodulation reference signals received (DM-RS) when QCL between the DM-RS antenna ports and CSI-RS antenna ports is not signaled to the UE.

In one embodiment, the DM-RS antenna port corresponds to antenna ports of the PDSCH or an enhanced physical downlink control channel (EPDCCH).

Figure 7:
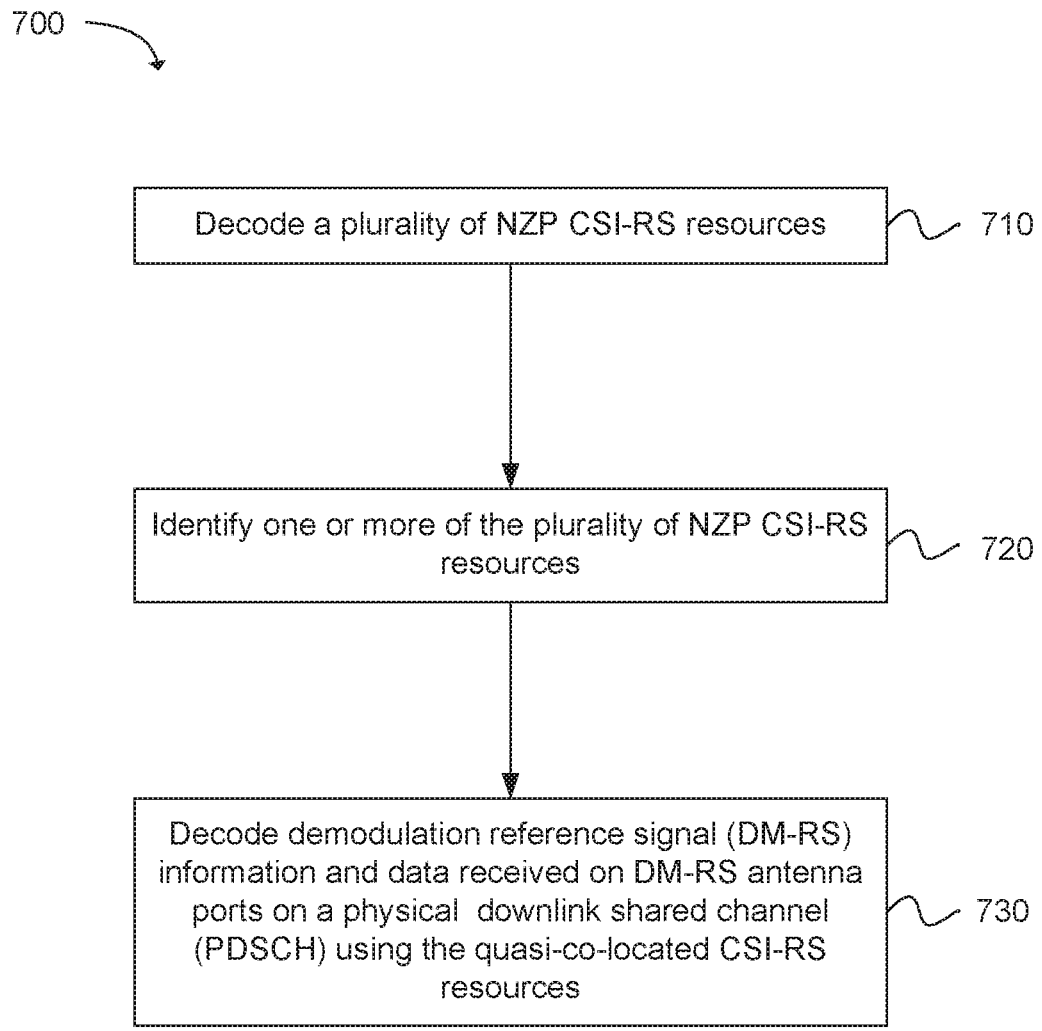
FIG. 7 depicts functionality of an apparatus of a UE operable to configured for a transmission mode 10 (TM 10) and operable to perform downlink coordinated multi-point (CoMP) operations with dynamic point selection (DPS) of transmission points, in accordance with an example.

Another example, provides functionality 700 of an apparatus of a UE configured for a transmission mode 10 (TM 10) and operable to perform downlink coordinated multi-point (COMP) operations with dynamic point selection (DPS) of transmission points, as depicted in FIG. 7. The apparatus of the UE can comprise one or more processors configured to decode a plurality of NZP CSI-RS resources 710. The apparatus of the UE can comprise one or more processors configured to identify one or more of the plurality of NZP CSI-RS resources 720. The apparatus of the UE can comprise one or more processors configured to decode demodulation reference signal (DM-RS) information and data received on DM-RS antenna ports on a physical downlink shared channel (PDSCH) using the quasi-co-located CSI-RS resources 730.

In one embodiment, a first set of NZP CSI-RS can be used for channel state information reporting.

In one embodiment, the second set of NZP CSI-RS is used for quasi co-location with DM-RS antenna ports.

In one embodiment, the DM-RS antenna port corresponds to antenna ports of the PDSCH or an enhanced physical downlink control channel (EPDCCH).

In one embodiment, a second set of CSI-RS of a plurality of NZP CSI-RS resource can be configured to use a single antenna port for determination of large scale parameter measurements. The large scale parameter measurement can comprise Doppler shift, Doppler spread, average delay and delay spread.

Figure 8:
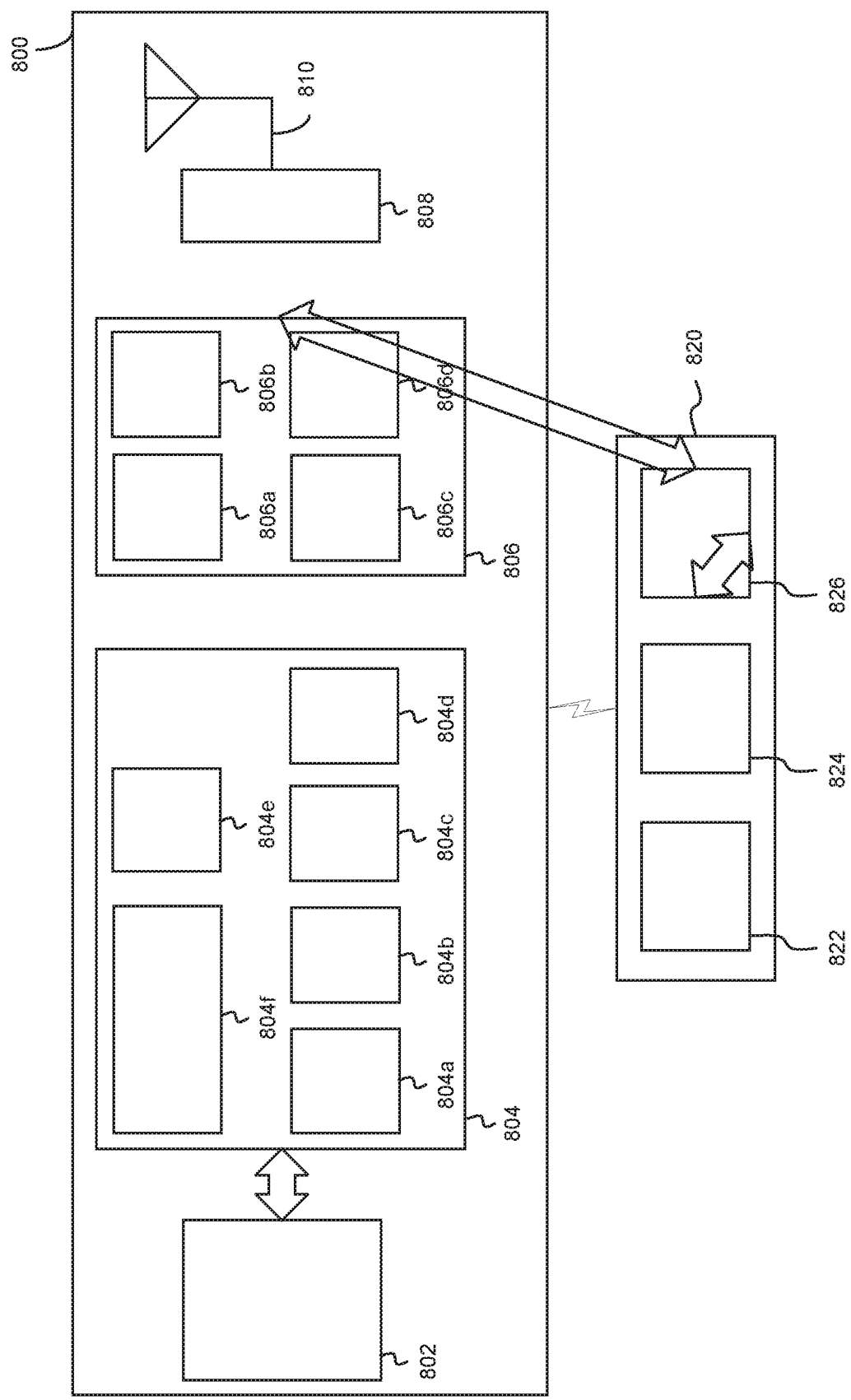
FIG. 8 illustrates a diagram of a wireless device (e.g., UE) and a base station (e.g., eNodeB) in accordance with an example.

FIG. 8 provides an example illustration of a user equipment (UE) device 800 and a node 820. The UE device 800 can include a wireless device, a mobile station (MS), a mobile wireless device, a mobile communication device, a tablet, a handset, or other type of wireless device. The UE device 800 can include one or more antennas configured to communicate with the node 820 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 820 can include one or more processors 822, memory 824 and a transceiver 826. The UE device 800 can be configured to communicate using at least one wireless communication standard including 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown. In addition, the node 820 may include, similar to that described for the UE device 800, application circuitry, baseband circuitry, Radio Frequency (RF) circuitry, front-end module (FEM) circuitry and one or more antennas The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a necessity. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature down-conversion and/or up-conversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down-conversion and/or direct up-conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a necessity. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

Figure 9:
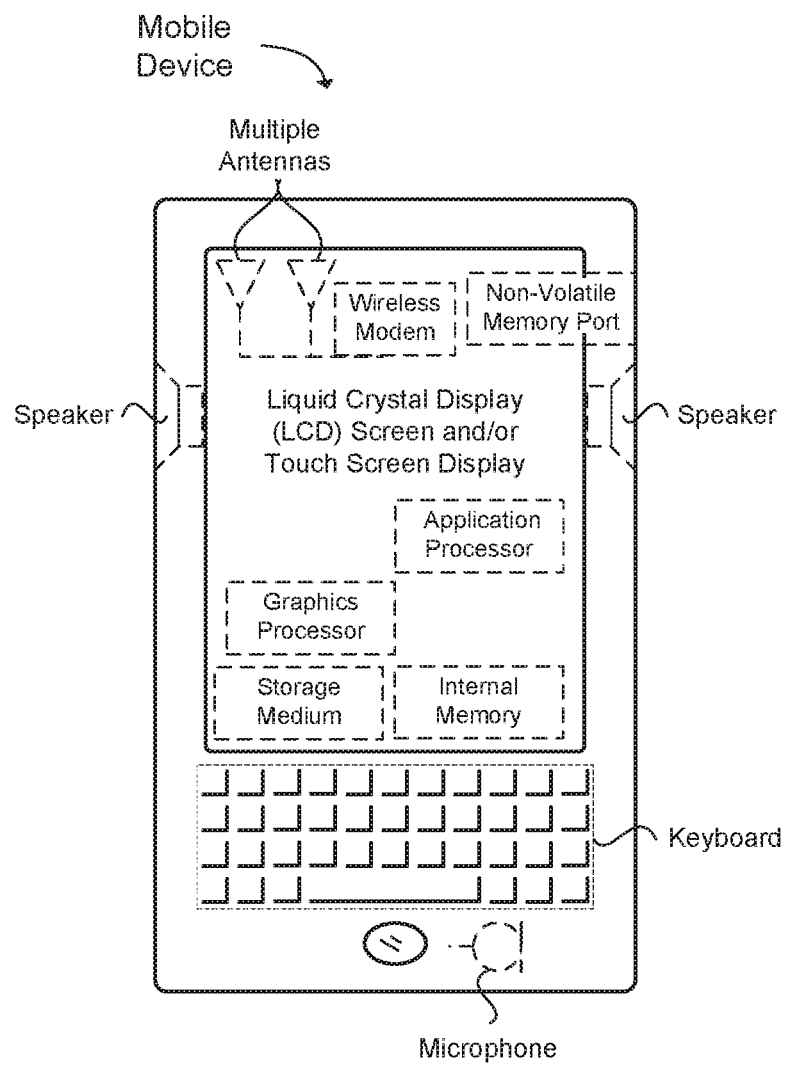
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a user equipment (UE) configured for a transmission mode 10 (TM 10) and operable to perform downlink coordinated multi-point (CoMP) operations with a single transmission point (TP), the apparatus having one or more processors configured to: decode configuration information for a non-zero channel state information reference signal (NZP CSI-RS) resource received from a serving cell; decode configuration information for a measurement restriction for the NZP CSI-RS resource for the UE received from the serving cell; configure the UE with a quasi-co-location (QCL) type A and not a QCL type B based on the measurement restriction; and, decode channel state information reference signals (CSI-RS) received from the single transmission point in the configured NZP CSI-RS resource on different downlink (DL) subframes.

Example 2 includes the apparatus of example 1 wherein the one or more processors are configured to decode the CSI-RS signals received on one or more of antenna ports 7 to 22 which are quasi-co-located with CRS antenna ports 0 to 3 transmitted by the serving cell.

Example 3 includes the apparatus of examples 1 or 2, wherein the antenna ports 0 to 3 and 7 to 22 are quasi-co-located with respect to large scale parameters comprising: Doppler shift, Doppler spread, average delay and delay spread, to enable the UE to measure the large scale parameters using the QCL antenna ports.

Example 4 includes the apparatus of examples 1 or 2, wherein the one or more processors are configured to: decode configuration information received from the single transmission point via higher layer signaling, a parameter set comprising: a number of cell-specific reference signal (CRS) antenna ports for physical downlink shared channel (PDSCH) resource elements (RE) mapping; a CRS frequency shift for PDSCH RE mapping; a multicast broadcast single frequency network (MBSFN) subframe configuration for PDSCH RE mapping; a Zero-power CSI-RS resource configuration for PDSCH RE mapping; a PDSCH starting position for PDSCH RE mapping; and, a CSI-RS resource configuration identity for quasi co-location.

Example 5 includes the apparatus of example 1, wherein a plurality of coordinating TPs are configured for tight time and frequency synchronization.

Example 6 includes The apparatus of example 2, wherein the CSI-RS signals originate from the same serving cell when the measurement restriction for CSI-RS is configured.

Example 7 includes The apparatus of examples 1 or 2, wherein the DM-RS antenna port corresponds to antenna ports of the PDSCH and an enhanced physical downlink control channel (EPDCCH).

Example 8 includes An apparatus of a user equipment (UE) configured for a transmission mode 10 (TM 10) and operable to perform downlink coordinated multi-point (CoMP) operations with dynamic point selection (DPS) of transmission points, the apparatus having one or more processors configured to: define channel state information reference signal (CSI-RS) antenna ports, on which CSI-RS transmissions occur from the transmission points, as quasi-co-located with demodulation reference signal (DM-RS) antenna ports; identify a selected CSI-RS transmission on one of the defined CSI-RS antenna ports; and, decode DM-RS information and data received from the DM-RS transmission ports on a physical downlink shared channel (PDSCH) or an enhanced physical downlink control channel (EPDCCH) using the CSI-RS transmission.

Example 9 includes The apparatus of example 8, wherein the one or more processors are configured to: estimate large-scale parameters for the CSI-RS antenna ports and the DM-RS antenna ports using the selected CSI-RS transmission, wherein the large scale parameters include: Doppler shift, Doppler spread, average delay, delay spread and average gain.

Example 10 includes The apparatus of example 8 or 9, wherein the one or more processors are configured to identify a selected CSI-RS transmission as a last transmitted CSI-RS transmission wherein a channel state information (CSI) request is received by the UE.

Example 11 includes The apparatus of example 8 or 9, wherein the one or more processors are configured to decode the CSI-RS transmissions received on one or more of CSI-RS antenna ports 15 to 22.

Example 12 includes The apparatus of example 11, further comprising: cell-specific reference signals (CRS) transmitted on antenna port 0 to 3 associated with the NZP CSI-RS resource transmitted on antenna ports 15 to 22.

Example 13 includes The apparatus of example 8 or 9, wherein the DM-RS antenna port corresponds to antenna ports of the PDSCH or an enhanced physical downlink control channel (EPDCCH).

Example 14 includes An apparatus of a user equipment (UE) configured for a transmission mode 10 (TM 10) and operable to perform downlink coordinated multi-point (CoMP) operations with dynamic point selection (DPS) of transmission points, the apparatus having one or more processors configured to: decode a plurality of NZP CSI-RS resources; identify a subset of the plurality of CSI-RS resources as non-zero power (NZP) CSI-RS resources that are quasi-co-located; and, decode demodulation reference signal (DM-RS) information and data received on DM-RS antenna ports on a physical downlink shared channel (PDSCH) using the selected subset of NZP CSI-RS resources.

Example 15 includes The apparatus of example 14, wherein the one or more processors are configured to: decode configuration information received from a DPS transmission from the transmission points via higher layer signalling, wherein the configuration information includes a radio resource control (RRC) QCL parameter set comprising: a number of cell-specific reference signal (CRS) antenna ports for physical downlink shared channel (PDSCH) resource element (RE) mapping; a CRS frequency shift for PDSCH RE mapping; a multicast broadcast single frequency network (MBSFN) subframe configuration for PDSCH RE mapping; a zero-power CSI-RS resource configuration for PDSCH RE mapping; a PDSCH starting position for PDSCH RE mapping; and a CSI-RS resource configuration identity for quasi co-location.

Example 16 includes The apparatus of example 15, wherein the RRC QCL parameter set further comprises a CSI-RS subframe configuration for quasi co-location indication of NZP CSI-RS resources.

Example 17 includes The apparatus of example 15 and 16, wherein the selected subset of the NZP CSI-RS resources that are quasi-co-located comprise a predetermined index of the CSI-RS resources.

Example 18 includes The apparatus of example 14, wherein the one or more processors are configured to estimate large-scale parameters for the DM-RS antenna ports using the selected subset of the NZP CSI-RS resources that are quasi-co-located and DM-RS.

Example 19 includes The apparatus of example 14, wherein the one or more processors are configured to calculate a timing offset and a Doppler shift at the UE from an antenna port of a received demodulation reference signals received (DM-RS) when QCL between the DM-RS antenna ports and CSI-RS antenna ports is not signaled to the UE.

Example 20 includes The apparatus of example 14, wherein the DM-RS antenna port corresponds to antenna ports of the PDSCH or an enhanced physical downlink control channel (EPDCCH).

Example 21 includes An apparatus of a user equipment (UE) configured for a transmission mode 10 (TM 10) and operable to perform downlink coordinated multi-point (CoMP) operations with dynamic point selection (DPS) of transmission points, the apparatus having one or more processors configured to: decode a plurality of NZP CSI-RS resources; identify one or more of the plurality of NZP CSI-RS resources; and decode demodulation reference signal (DM-RS) information and data received on DM-RS antenna ports on a physical downlink shared channel (PDSCH) using the quasi-co-located CSI-RS resources.

Example 22 includes The apparatus of example 21, wherein a first set of NZP CSI-RS is used for channel state information reporting.

Example 23 includes The apparatus of example 21, wherein the second set of NZP CSI-RS is used for quasi co-location with DM-RS antenna ports.

Example 24 includes The apparatus of example 21, wherein the DM-RS antenna port corresponds to antenna ports of the PDSCH or an enhanced physical downlink control channel (EPDCCH).

Example 25 includes The apparatus of example 21 or 22 wherein a second set of CSI-RS of a plurality of NZP CSI-RS resource is configured to use a single antenna port for determination of large scale parameter measurements comprising: Doppler shift, Doppler spread, average delay and delay spread.

Example 26 includes An apparatus of a user equipment (UE) configured for a transmission mode 10 (TM 10) and operable to perform downlink coordinated multi-point (CoMP) operations with a single transmission point (TP), the apparatus comprising: one or more processors configured to: decode configuration information for a non-zero channel state information reference signal (NZP CSI-RS) resource received from a serving cell; decode configuration information for a measurement restriction for the NZP CSI-RS resource for the UE received from the serving cell; configure the UE with a quasi-co-location (QCL) type A and not a QCL type B based on the measurement restriction; and, decode channel state information reference signals (CSI-RS) received from the single transmission point in the configured NZP CSI-RS resource on different downlink (DL) subframes; and, a memory interfaced with the one or more processors, wherein the memory is configured to store the CSI-RS.

Example 27 includes The apparatus of example 26, wherein the one or more processors are configured to decode the CSI-RS signals received on one or more of antenna ports 7 to 22 which are quasi-co-located with CRS antenna ports 0 to 3 transmitted by the serving cell.

Example 28 includes The apparatus of example 27, wherein the antenna ports 0 to 3 and 7 to 22 are quasi-co-located with respect to large scale parameters comprising: Doppler shift, Doppler spread, average delay and delay spread, to enable the UE to measure the large scale parameters using the QCL antenna ports.

Example 29 includes The apparatus of example 26, wherein the one or more processors are configured to: decode configuration information received from the single transmission point via higher layer signaling, a parameter set comprising: a number of cell-specific reference signal (CRS) antenna ports for physical downlink shared channel (PDSCH) resource elements (RE) mapping; a CRS frequency shift for PDSCH RE mapping; a multicast broadcast single frequency network (MBSFN) subframe configuration for PDSCH RE mapping; a Zero-power CSI-RS resource configuration for PDSCH RE mapping; a PDSCH starting position for PDSCH RE mapping; and, a CSI-RS resource configuration identity for quasi co-location.

Example 30 includes The apparatus of example 26, wherein a plurality of coordinating TPs are configured for tight time and frequency synchronization.

Example 31 includes The apparatus of example 27, wherein the CSI-RS signals originate from the same serving cell when the measurement restriction for CSI-RS is configured.

Example 32 includes The apparatus of example 26, wherein the DM-RS antenna port corresponds to antenna ports of the PDSCH and an enhanced physical downlink control channel (EPDCCH).

Example 33 includes An apparatus of a user equipment (UE) configured for a transmission mode 10 (TM 10) and operable to perform downlink coordinated multi-point (CoMP) operations with dynamic point selection (DPS) of transmission points, the apparatus comprising: one or more processors configured to: define channel state information reference signal (CSI-RS) antenna ports, on which CSI-RS transmissions occur from the transmission points, as quasi-co-located with demodulation reference signal (DM-RS) antenna ports; identify a selected CSI-RS transmission on one of the defined CSI-RS antenna ports; and, decode DM-RS information and data received from the DM-RS transmission ports on a physical downlink shared channel (PDSCH) or an enhanced physical downlink control channel (EPDCCH) using the CSI-RS transmission; and, a memory interfaced with the one or more processors, wherein the memory is configured to store the CSI-RS.

Example 34 includes The apparatus of example 33, wherein the one or more processors are configured to: estimate large-scale parameters for the CSI-RS antenna ports and the DM-RS antenna ports using the selected CSI-RS transmission, wherein the large scale parameters include: Doppler shift, Doppler spread, average delay, delay spread and average gain.

Example 35 includes The apparatus of example 33, wherein the one or more processors are configured to identify a selected CSI-RS transmission as a last transmitted CSI-RS transmission wherein a channel state information (CSI) request is received by the UE.

Example 36 includes The apparatus of example 33, wherein the one or more processors are configured to decode the CSI-RS transmissions received on one or more of CSI-RS antenna ports 15 to 22.

Example 37 includes The apparatus of example 36, further comprising: cell-specific reference signals (CRS) transmitted on antenna port 0 to 3 associated with the NZP CSI-RS resource transmitted on antenna ports 15 to 22.

Example 38 includes The apparatus of example 33, wherein the DM-RS antenna port corresponds to antenna ports of the PDSCH or an enhanced physical downlink control channel (EPDCCH).

Example 39 includes An apparatus of a user equipment (UE) configured for a transmission mode 10 (TM 10) and operable to perform downlink coordinated multi-point (CoMP) operations with dynamic point selection (DPS) of transmission points, the apparatus comprising: one or more processors configured to: decode a plurality of NZP CSI-RS resources; identify a subset of the plurality of CSI-RS resources as non-zero power (NZP) CSI-RS resources that are quasi-co-located; and, decode demodulation reference signal (DM-RS) information and data received on DM-RS antenna ports on a physical downlink shared channel (PDSCH) using the selected subset of NZP CSI-RS resources; and, a memory interfaced with the one or more processors, wherein the memory is configured to store the plurality of CSI-RS resources.

Example 40 includes The apparatus of example 39, wherein the one or more processors are configured to: decode configuration information received from a DPS transmission from the transmission points via higher layer signaling, wherein the configuration information includes a radio resource control (RRC) QCL parameter set comprising: a number of cell-specific reference signal (CRS) antenna ports for physical downlink shared channel (PDSCH) resource element (RE) mapping; a CRS frequency shift for PDSCH RE mapping; a multicast broadcast single frequency network (MBSFN) subframe configuration for PDSCH RE mapping; a zero-power CSI-RS resource configuration for PDSCH RE mapping; a PDSCH starting position for PDSCH RE mapping; and a CSI-RS resource configuration identity for quasi co-location.

Example 41 includes The apparatus of example 40, wherein the RRC QCL parameter set further comprises a CSI-RS subframe configuration for quasi co-location indication of NZP CSI-RS resources.

Example 42 includes The apparatus of example 40, wherein the selected subset of the NZP CSI-RS resources that are quasi-co-located comprise a predetermined index of the CSI-RS resources.

Example 43 includes The apparatus of example 39, wherein the one or more processors are configured to estimate large-scale parameters for the DM-RS antenna ports using the selected subset of the NZP CSI-RS resources that are quasi-co-located and DM-RS.

Example 44 includes The apparatus of example 39, wherein the one or more processors are configured to calculate a timing offset and a Doppler shift at the UE from an antenna port of a received demodulation reference signals received (DM-RS) when QCL between the DM-RS antenna ports and CSI-RS antenna ports is not signaled to the UE.

Example 45 includes The apparatus of example 39, wherein the DM-RS antenna port corresponds to antenna ports of the PDSCH or an enhanced physical downlink control channel (EPDCCH).

Example 46 includes An apparatus of a user equipment (UE) configured for a transmission mode 10 (TM 10) and operable to perform downlink coordinated multi-point (CoMP) operations with dynamic point selection (DPS) of transmission points, the apparatus comprising: one or more processors configured to: decode a plurality of NZP CSI-RS resources; identify one or more of the plurality of NZP CSI-RS resources; and decode demodulation reference signal (DM-RS) information and data received on DM-RS antenna ports on a physical downlink shared channel (PDSCH) using the quasi-co-located CSI-RS resources; and, a memory interfaced with the one or more processors, wherein the memory is configured to store the DM-RS information.

Example 47 includes The apparatus of example 46, wherein a first set of NZP CSI-RS is used for channel state information reporting.

Example 48 includes The apparatus of example 46, wherein the second set of NZP CSI-RS is used for quasi co-location with DM-RS antenna ports.

Example 49 includes The apparatus of example 46, wherein the DM-RS antenna port corresponds to antenna ports of the PDSCH or an enhanced physical downlink control channel (EPDCCH).

Example 50 includes The apparatus of example 46, wherein a second set of CSI-RS of a plurality of NZP CSI-RS resource is configured to use a single antenna port for determination of large scale parameter measurements comprising: Doppler shift, Doppler spread, average delay and delay spread.

Example 51 includes An apparatus of a user equipment (UE) configured for a transmission mode 10 (TM 10) and operable to perform downlink coordinated multi-point (CoMP) operations with a single transmission point (TP), the apparatus having one or more processors configured to: decode configuration information for a non-zero channel state information reference signal (NZP CSI-RS) resource received from a serving cell; decode configuration information for a measurement restriction for the NZP CSI-RS resource for the UE received from the serving cell; configure the UE with a quasi-co-location (QCL) type A and not a QCL type B based on the measurement restriction; and, decode channel state information reference signals (CSI-RS) received from the single transmission point in the configured NZP CSI-RS resource on different downlink (DL) sub-frames.

Example 52 includes The apparatus of example 51, wherein the one or more processors are configured to decode the CSI-RS signals received on one or more of antenna ports 7 to 22 which are quasi-co-located with CRS antenna ports 0 to 3 transmitted by the serving cell.

Example 53 includes The apparatus of example any of examples 51 to 52, wherein the antenna ports 0 to 3 and 7 to 22 are quasi-co-located with respect to large scale parameters comprising: Doppler shift, Doppler spread, average delay and delay spread, to enable the UE to measure the large scale parameters using the QCL antenna ports.

Example 54 includes The apparatus of example any of examples 51 to 53, wherein the one or more processors are configured to: decode configuration information received from the single transmission point via higher layer signaling, a parameter set comprising: a number of cell-specific reference signal (CRS) antenna ports for physical downlink shared channel (PDSCH) resource elements (RE) mapping; a CRS frequency shift for PDSCH RE mapping; a multicast broadcast single frequency network (MBSFN) subframe configuration for PDSCH RE mapping; a Zero-power CSI-RS resource configuration for PDSCH RE mapping; a PDSCH starting position for PDSCH RE mapping; and, a CSI-RS resource configuration identity for quasi co-location.

Example 55 includes The apparatus of any of examples 51 to 54, wherein a plurality of coordinating TPs are configured for tight time and frequency synchronization.

Example 56 includes The apparatus of any of example 51, wherein: the CSI-RS signals originate from the same serving cell when the measurement restriction for CSI-RS is configured; or, the DM-RS antenna port corresponds to antenna ports of the PDSCH and an enhanced physical downlink control channel (EPDCCH).

Example 57 includes An apparatus of a user equipment (UE) configured for a transmission mode 10 (TM 10) and operable to perform downlink coordinated multi-point (CoMP) operations with dynamic point selection (DPS) of transmission points, the apparatus having one or more processors configured to: define channel state information reference signal (CSI-RS) antenna ports, on which CSI-RS transmissions occur from the transmission points, as quasi-co-located with demodulation reference signal (DM-RS) antenna ports; identify a selected CSI-RS transmission on one of the defined CSI-RS antenna ports; and, decode DM-RS information and data received from the DM-RS transmission ports on a physical downlink shared channel (PDSCH) or an enhanced physical downlink control channel (EPDCCH) using the CSI-RS transmission.

Example 58 includes The apparatus of example 57, wherein the one or more processors are configured to: estimate large-scale parameters for the CSI-RS antenna ports and the DM-RS antenna ports using the selected CSI-RS transmission, wherein the large scale parameters include: Doppler shift, Doppler spread, average delay, delay spread and average gain.

Example 59 includes The apparatus of any of examples 57 to 58, wherein the one or more processors are configured to: identify a selected CSI-RS transmission as a last transmitted CSI-RS transmission wherein a channel state information (CSI) request is received by the UE; or decode the CSI-RS transmissions received on one or more of CSI-RS antenna ports 15 to 22.

Example 60 includes The apparatus of any of examples 57 to 59, further comprising: cell-specific reference signals (CRS) transmitted on antenna port 0 to 3 associated with the NZP CSI-RS resource transmitted on antenna ports 15 to 22.

Example 61 includes The apparatus of any of examples 57 to 60, wherein the DM-RS antenna port corresponds to antenna ports of the PDSCH or an enhanced physical downlink control channel (EPDCCH).

Example 62 includes An apparatus of a user equipment (UE) configured for a transmission mode 10 (TM 10) and operable to perform downlink coordinated multi-point (CoMP) operations with dynamic point selection (DPS) of transmission points, the apparatus having one or more processors configured to: decode a plurality of NZP CSI-RS resources; identify a subset of the plurality of CSI-RS resources as non-zero power (NZP) CSI-RS resources that are quasi-co-located; and, decode demodulation reference signal (DM-RS) information and data received on DM-RS antenna ports on a physical downlink shared channel (PDSCH) using the selected subset of NZP CSI-RS resources.

Example 63 includes The apparatus of example 62, wherein the one or more processors are configured to: decode configuration information received from a DPS transmission from the transmission points via higher layer signaling, wherein the configuration information includes a radio resource control (RRC) QCL parameter set comprising: a number of cell-specific reference signal (CRS) antenna ports for physical downlink shared channel (PDSCH) resource element (RE) mapping; a CRS frequency shift for PDSCH RE mapping; a multicast broadcast single frequency network (MBSFN) subframe configuration for PDSCH RE mapping; a zero-power CSI-RS resource configuration for PDSCH RE mapping; a PDSCH starting position for PDSCH RE mapping; and a CSI-RS resource configuration identity for quasi co-location.

Example 64 includes The apparatus of any of examples 62 to 63, wherein the RRC QCL parameter set further comprises: a CSI-RS subframe configuration for quasi co-location indication of NZP CSI-RS resources; and the selected subset of the NZP CSI-RS resources that are quasi-co-located comprise a predetermined index of the CSI-RS resources.

Example 65 includes The apparatus of any of examples 62 to 64, wherein the one or more processors are configured to: estimate large-scale parameters for the DM-RS antenna ports using the selected subset of the NZP CSI-RS resources that are quasi-co-located and DM-RS, and calculate a timing offset and a Doppler shift at the UE from an antenna port of a received demodulation reference signals received (DM-RS) when QCL between the DM-RS antenna ports and CSI-RS antenna ports is not signaled to the UE, wherein the DM-RS antenna port corresponds to antenna ports of the PDSCH or an enhanced physical downlink control channel (EPDCCH).

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology.

One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) configured for a transmission mode 10 (TM 10) and operable to perform downlink coordinated multi-point (CoMP) operations with dynamic point selection (DPS) of transmission points, the apparatus comprising:
   one or more processors configured to:
      decode a plurality of NZP CSI-RS resources;
      identify a subset of the plurality of CSI-RS resources as non-zero power (NZP) CSI-RS resources that are quasi-co-located; and,
      decode demodulation reference signal (DM-RS) information and data received on DM-RS antenna ports on a physical downlink shared channel (PDSCH) using the selected subset of NZP CSI-RS resources; and,
   a memory interfaced with the one or more processors, wherein the memory is configured to store the plurality of CSI-RS resources.

2. The apparatus of claim 1, wherein the one or more processors are configured to:
   decode configuration information received from a DPS transmission from the transmission points via higher layer signalling, wherein the configuration information includes a radio resource control (RRC) QCL parameter set comprising:
      a number of cell-specific reference signal (CRS) antenna ports for physical downlink shared channel (PDSCH) resource element (RE) mapping;
      a CRS frequency shift for PDSCH RE mapping;
      a multicast broadcast single frequency network (MB-SFN) subframe configuration for PDSCH RE mapping;
      a zero-power CSI-RS resource configuration for PDSCH RE mapping;
      a PDSCH starting position for PDSCH RE mapping; and
      a CSI-RS resource configuration identity for quasi co-location.

3. The apparatus of claim 2, wherein the RRC QCL parameter set further comprises a CSI-RS subframe configuration for quasi co-location indication of NZP CSI-RS resources.

4. The apparatus of claim 2, wherein the selected subset of the NZP CSI-RS resources that are quasi-co-located comprise a predetermined index of the CSI-RS resources.

5. The apparatus of claim 1, wherein the one or more processors are configured to estimate large-scale parameters for the DM-RS antenna ports using the selected subset of the NZP CSI-RS resources that are quasi-co-located and DM-RS.

6. The apparatus of claim 1, wherein the one or more processors are configured to calculate a timing offset and a Doppler shift at the UE from an antenna port of a received demodulation reference signals received (DM-RS) when QCL between the DM-RS antenna ports and CSI-RS antenna ports is not signalled to the UE.

7. The apparatus of claim 1, wherein the DM-RS antenna port corresponds to antenna ports of the PDSCH or an enhanced physical downlink control channel (EPDCCH).

8. An apparatus of a user equipment (UE) configured for a transmission mode 10 (TM 10) and operable to perform downlink coordinated multi-point (CoMP) operations with dynamic point selection (DPS) of transmission points, the apparatus comprising:
   one or more processors configured to:
      decode a plurality of NZP CSI-RS resources;
      identify one or more of the plurality of NZP CSI-RS resources; and
      decode demodulation reference signal (DM-RS) information and data received on DM-RS antenna ports on a physical downlink shared channel (PDSCH) using the identified NZP CSI-RS resources; and,
   a memory interfaced with the one or more processors, wherein the memory is configured to store the DM-RS information.

9. The apparatus of claim 8, wherein a first set of NZP CSI-RS is used for channel state information reporting.

10. The apparatus of claim 8, wherein a second set of NZP CSI-RS is used for quasi co-location with DM-RS antenna ports.

11. The apparatus of claim 8, wherein the DM-RS antenna port corresponds to antenna ports of the PDSCH or an enhanced physical downlink control channel (EPDCCH).

12. The apparatus of claim 8 wherein a second set of CSI-RS of a plurality of NZP CSI-RS resource is configured to use a single antenna port for determination of large scale parameter measurements comprising: Doppler shift, Doppler spread, average delay and delay spread.

* * * * *